(12) United States Patent
Hu et al.

(10) Patent No.: US 12,523,580 B2
(45) Date of Patent: Jan. 13, 2026

(54) SAMPLING STRUCTURE, SEALING STRUCTURE AND DETECTION ASSEMBLY

(71) Applicants: BEIJING BOE HEALTH TECHNOLOGY CO., LTD., Beijing (CN); BOE TECHNOLOGY GROUP CO., LTD., Beijing (CN)

(72) Inventors: Lijiao Hu, Beijing (CN); Haochen Cui, Beijing (CN); Chungen Yuan, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1064 days.

(21) Appl. No.: 17/619,297

(22) PCT Filed: Jun. 9, 2020

(86) PCT No.: PCT/CN2020/095043
§ 371 (c)(1),
(2) Date: Dec. 15, 2021

(87) PCT Pub. No.: WO2020/259272
PCT Pub. Date: Dec. 30, 2020

(65) Prior Publication Data
US 2022/0364964 A1 Nov. 17, 2022

(30) Foreign Application Priority Data
Jun. 26, 2019 (CN) .......................... 201910563566.8

(51) Int. Cl.
*G01N 1/38* (2006.01)
*B01L 3/00* (2006.01)
*G01N 1/14* (2006.01)

(52) U.S. Cl.
CPC .......... *G01N 1/38* (2013.01); *B01L 3/502715* (2013.01); *B01L 3/502753* (2013.01);
(Continued)

(58) Field of Classification Search
CPC ...... G01N 1/38; G01N 1/14; B01L 3/502715; B01L 3/502753; B01L 2200/027;
(Continued)

(56) References Cited

U.S. PATENT DOCUMENTS 8,066,669 B2    11/2011 Christensen et al.
2002/0187547 A1    12/2002 Taylor et al.
(Continued)

FOREIGN PATENT DOCUMENTS

CN    2425517 Y    4/2001
CN    2646222 Y    10/2004
(Continued)

OTHER PUBLICATIONS

European Search Report from European Patent Application No. 20830629.0 dated Jun. 30, 2022.
(Continued)

*Primary Examiner* — Brian J. Sines
(74) *Attorney, Agent, or Firm* — Dilworth & Barrese, LLP.; Michael J. Musella, Esq.

(57) ABSTRACT

A sampling structure, a sealing structure and a detection assembly are provided. The sampling structure includes a first main body, a second main body and a third main body. The first main body includes a first channel, the first channel includes a first opening that is exposed. The second main body is connected to the first main body and includes a second channel and at least one partition column located in the second channel, the second channel is linked with the first channel, and a first gap is between the partition column and a channel wall of the second channel. The third main (Continued)

body is connected to the second main body and includes a chamber, the chamber is linked with the second channel and is capable of containing a sample.

19 Claims, 7 Drawing Sheets

(52) U.S. Cl.
CPC .......... *G01N 1/14* (2013.01); *B01L 2200/027* (2013.01); *B01L 2200/0689* (2013.01); *B01L 2200/10* (2013.01); *B01L 2300/041* (2013.01); *B01L 2300/048* (2013.01); *B01L 2300/0867* (2013.01); *B01L 2300/123* (2013.01)

(58) Field of Classification Search
CPC ......... B01L 2200/0689; B01L 2200/10; B01L 2300/041; B01L 2300/048; B01L 2300/0867; B01L 2300/123; B01L 2200/0642; B01L 3/5027; B01L 2300/0861; C12M 23/16; C12M 33/00
See application file for complete search history.

(56) References Cited

U.S. PATENT DOCUMENTS

| | | | |
|---|---|---|---|
| 2004/0211798 A1 | 10/2004 | Schechter | |
| 2005/0077493 A1 | 4/2005 | Okada | |
| 2017/0274376 A1* | 9/2017 | Nobile | ................ B01L 3/50825 |
| 2018/0246233 A1 | 8/2018 | Hill | |
| 2018/0272331 A1 | 9/2018 | Choi et al. | |
| 2019/0091681 A1 | 3/2019 | Nobile et al. | |

FOREIGN PATENT DOCUMENTS

| | | |
|---|---|---|
| CN | 1980741 A | 6/2007 |
| CN | 200952979 Y | 9/2007 |
| CN | 101437616 A | 5/2009 |
| CN | 101563044 A | 10/2009 |
| CN | 102304471 A | 1/2012 |
| CN | 103301796 A | 9/2013 |
| CN | 103534030 A | 1/2014 |
| CN | 105126684 A | 12/2015 |
| CN | 205401851 U | 7/2016 |
| CN | 106255869 A | 12/2016 |
| CN | 205978669 U | 2/2017 |
| CN | 106492717 A | 3/2017 |
| CN | 106957788 A | 7/2017 |
| CN | 108116764 A | 6/2018 |
| CN | 109499634 A | 3/2019 |
| CN | 109603941 A | 4/2019 |
| CN | 109760940 A | 5/2019 |
| CN | 208928185 U | 6/2019 |
| CN | 210646456 U | 6/2020 |
| CN | 212595784 U | 2/2021 |
| JP | 2003112002 A | 4/2003 |
| WO | 2018142511 A1 | 8/2018 |

OTHER PUBLICATIONS

Chinese Office Action from China Patent Application No. 201910563566.8 dated May 20, 2024.

* cited by examiner

SAMPLING STRUCTURE, SEALING STRUCTURE AND DETECTION ASSEMBLY

CROSS-REFERENCE TO RELATED APPLICATION

The present application claims priority of Chinese Patent Application No. 201910563566.8, filed on Jun. 26, 2019, for all purposes, the entire content disclosed by the Chinese patent application is incorporated herein by reference as part of the present application.

TECHNICAL FIELD

Embodiments of the present disclosure relate to a sampling structure, a sealing structure, and a detection assembly.

BACKGROUND

The microfluidic chip technology integrates basic operation units of preparation, reaction, separation, and detection of samples involved in the fields of biology, chemistry, and medicine into a chip with micrometer-scale micro-channels, and automatically completes the entire process of reaction and analysis. The chip used in this process is called as a microfluidic chip, and can also be called as a lab-on-a-chip. The microfluidic chip technology has advantages of small sample consumption, fast analysis speed, being easy to make portable instruments, and being suitable for real-time and on-site analysis, and has been widely used in many fields such as biology, chemistry, and medicine.

SUMMARY

At least one embodiment of the present disclosure provides a sampling structure, which comprises a first main body, a second main body, and a third main body. The first main body comprises a first channel, the first channel comprises a first opening that is exposed; the second main body is connected to the first main body and comprises a second channel and at least one partition column located in the second channel, the second channel is linked with the first channel, and a first gap is between the at least one partition column and a channel wall of the second channel; and the third main body is connected to the second main body and comprises a chamber, the chamber is linked with the second channel and is capable of containing a sample.

For example, in the sampling structure provided by at least one embodiment of the present disclosure, the at least one partition column comprises a plurality of partition columns, the first channel comprises a second opening connected to the second channel, and the plurality of partition columns are arranged at intervals around the second opening.

For example, in the sampling structure provided by at least one embodiment of the present disclosure, the plurality of partition columns are arranged centro-symmetrically around a center axis of the second opening.

For example, in the sampling structure provided by at least one embodiment of the present disclosure, each of the plurality of partition columns at least partially overlaps with the second opening.

For example, in the sampling structure provided by at least one embodiment of the present disclosure, a cross section of each of the plurality of partition columns is in a fan-shape.

For example, in the sampling structure provided by at least one embodiment of the present disclosure, the plurality of partition columns are arranged opposite to each other and an overall shape obtained by an arrangement of the plurality of partition columns is a cylindrical shape.

For example, in the sampling structure provided by at least one embodiment of the present disclosure, a second gap is between adjacent partition columns, and a width of the second gap is 0.1 mm~2.5 mm.

For example, in the sampling structure provided by at least one embodiment of the present disclosure, a radius of the first channel is 0.1 mm~3 mm, and a radius of the second channel is 1 mm~10 mm.

For example, in the sampling structure provided by at least one embodiment of the present disclosure, a cross section of each of the plurality of partition columns is in a fan-shape, and a radius of the fan-shape is 0.5 mm~8 mm.

For example, in the sampling structure provided by at least one embodiment of the present disclosure, a length of the first channel is 0.1 mm~10 mm, and a length of the second channel is 1 mm~10 mm.

For example, in the sampling structure provided by at least one embodiment of the present disclosure, the first main body, the second main body, and the third main body are in an integral structure.

At least one embodiment of the present disclosure provides a sealing structure for sealing a sampling structure, which includes a sealing part, the sealing part comprises a main body part having elasticity; the sealing part comprises at least one exhaust hole, and the exhaust hole is configured to be in an open state or a closed state respectively in a case where the main body part is subjected to different forces.

For example, the sealing structure provided by at least one embodiment of the present disclosure further comprises a fixing part, the fixing part is fixedly connected with the sealing part and comprises a fixing structure.

For example, in the sealing structure provided by at least one embodiment of the present disclosure, the fixing structure is an annular sleeve structure.

For example, in the sealing structure provided by at least one embodiment of the present disclosure, in a case where a force received by the main body part is less than a threshold, the exhaust hole is in the open state; and in a case where the force received by the main body part is greater than or equal to the threshold, the exhaust hole is in the closed state.

For example, in the sealing structure provided by at least one embodiment of the present disclosure, the exhaust hole is a triangular prism exhaust hole, and comprises a first wall and a second wall connected with the main body part, the first wall and the second wall are connected, and two triangular openings, which are opposite to each other, are respectively formed between the first wall and the main body part and between the second wall and the main body part, in a case where the force received by the main body part is greater than or equal to the threshold, the first wall and the second wall are stretched to be located on a same plane, so that the two triangular openings are closed and the exhaust hole is in the closed state.

For example, in the sealing structure provided by at least one embodiment of the present disclosure, the sealing part further comprises a protrusion part for sealing, and the protrusion part is arranged around the main body part, a longitudinal section of the protrusion part is in a shape gradually narrowing from a first end of the protrusion part to a second end of the protrusion part, the first end of the protrusion part is an end connected to the main body part, and the second end of the protrusion part is an opposite end of the first end.

For example, in the sealing structure provided by at least one embodiment of the present disclosure, the fixing part and the sealing part are in an integral structure.

At least one embodiment of the present disclosure provides a detection assembly, which comprises a microfluidic chip, the sampling structure according to any one of above embodiments and a sealing structure, the microfluidic chip comprises a sampling groove and a sampling structure installation part, the sampling structure installation part is linked with the sampling groove, the sampling structure is arranged in the sampling groove, and the sealing structure is installed on the sampling structure installation part for sealing the sampling structure.

For example, in the detection assembly provided by at least one embodiment of the present disclosure, the sealing structure is the sealing structure according to any one of above embodiments, and the microfluidic chip further comprises a sealing structure installation part, the sealing part of the sealing structure is installed on the sampling structure installation part, and the fixing part of the sealing structure is installed on the sealing structure installation part.

For example, in the detection assembly provided by at least one embodiment of the present disclosure, the fixing structure of the sealing structure is an annular sleeve structure, and the sealing structure installation part comprises an annular groove matched with the annular sleeve structure.

For example, in the detection assembly provided by at least one embodiment of the present disclosure, the sealing part of the sealing structure further comprises a protrusion part for sealing, and the sampling structure installation part comprises a clamping slot matched with the protrusion part.

For example, the detection assembly provided by at least one embodiment of the present disclosure further comprises a top rod, the top rod is movably arranged for applying a force to the main body part.

For example, in the detection assembly provided by at least one embodiment of the present disclosure, the main body part further comprises a concave-platform groove matched with the top rod to guide a force application position of the top rod.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
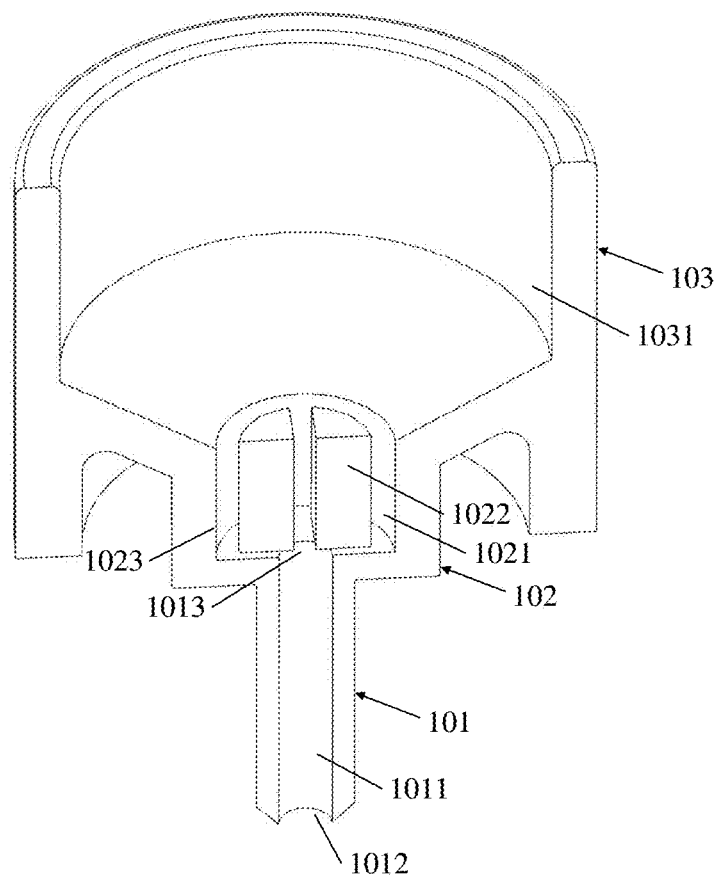
FIG. 1 is a cross sectional view of a sampling structure provided by at least one embodiment of the present disclosure.

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a design process of a microfluidic chip, it is usually desirable to integrate as many functions of analysis and detection as possible on the chip, to reduce the dependence of the chip on external operations, thereby achieving automation and integration. For example, a sampling component, a mixing component, and an analysis-detection component of the microfluidic chip can be integrated to achieve the automation of the detection process. In the detection process of the microfluidic chip, firstly, a sample to be tested is obtained by the sampling component, and then the sample to be tested and a detection reagent (or diluent or other reagents that make the sample to be tested more suitable for detecting) are fully mixed in the mixing component for use in the next detection operation. The mixing effect of the sample to be tested and the detection reagent plays a vital role in the detection process and a detection result of the microfluidic chip.

At least one embodiment of the present disclosure provides a sampling structure, which includes a first main body, a second main body, and a third main body. The first main body includes a first channel, and the first channel includes a first opening that is exposed. The second main body is connected to the first main body, and includes a second channel and at least one partition column located in the second channel, the second channel is linked with the first channel, and a first gap is between the at least one partition column and a channel wall of the second channel. The third main body is connected to the second main body and includes a chamber, the chamber is linked with the second channel and is capable of containing a sample.

At least one embodiment of the present disclosure provides a sealing structure, the sealing structure includes a sealing part, the sealing part includes a main body part having elasticity; the sealing part includes at least one exhaust hole, and the exhaust hole is configured to be in an open state or a closed state respectively in a case where the main body part is subjected to different forces.

At least one embodiment of the present disclosure further provides a detection assembly, which includes a microfluidic chip, the above-mentioned sampling structure, and a sealing structure. The microfluidic chip includes a sampling groove and a sampling structure installation part, the sampling structure installation part is linked with the sampling groove, the sampling structure may be arranged in the sampling groove, and the sealing structure may be installed on the sampling structure installation part for sealing the sampling structure.

The sampling structure, the sealing structure, and the detection assembly of the present disclosure will be described below through several specific embodiments.

Figure 2:
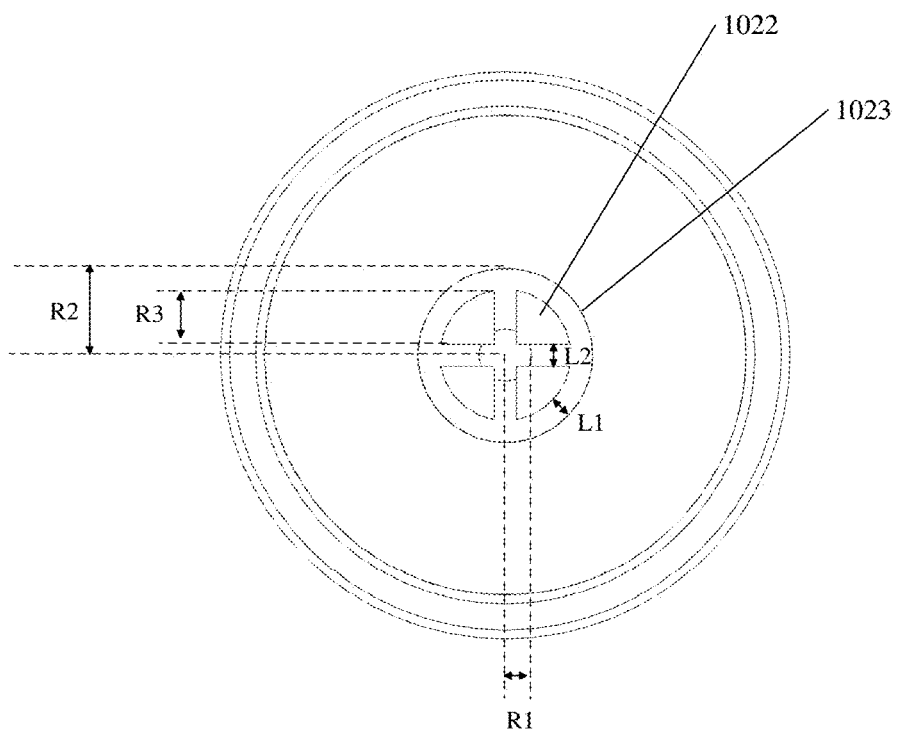
FIG. 2 is a top view of a sampling structure provided by at least one embodiment of the present disclosure.

At least one embodiment of the present disclosure provides a sampling structure. As shown in FIG. 1 and FIG. 2, the sampling structure includes a first main body 101, a second main body 102 and a third main body 103. The first main body 101 includes a first channel 1011, the first channel 1011 includes a first opening 1012 that is exposed, and the first opening 1012 is used to link with the outside. The second main body 102 is connected to the first main body 101 and includes a second channel 1021 and at least one partition column 1022 located in the second channel. The second channel 102 is linked with the first channel 101, and there is a first gap L1 between the partition column 1022 and a channel wall 1023 of the second channel 1021. The third main body 103 is connected to the second main body 102 and includes a chamber 1031. The chamber 1031 is linked with the second channel 1021 and can contain a sample.

The first channel 1011 and the second channel 1021 of the above-mentioned sampling structure can be configured to absorb a sample to be tested (such as blood, body fluid, etc.) by capillary action, and the second channel 1021 has the partition column 1022, the partition column 1022 is arranged in the second channel 1021, so that the sample to be tested, which is absorbed by the second channel 1021 and flows through the second channel 1021, can be split. In the chamber 1031, after the sample is mixed with a detection reagent, the sampling structure can achieve the effect of mixing the sample, so that the sampling structure integrates absorption and mixing functions as a whole, and has versatility. The sampling structure can be used, for example, in a detection device such as a microfluidic chip.

For example, in some embodiments, a diameter of the second channel 1021 is larger than a diameter of the first channel 101, thereby facilitating the arrangement of the partition column 1022 in the second channel 1021, and also increasing the absorption amount of the sample to be tested by the second channel 1021. An overall shape of the chamber 1031 may be a cylindrical shape, and a diameter of the chamber 1031 is larger than the diameter of the second channel 1021.

It should be noted that in at least one embodiment of the present disclosure, "diameter" represents a main dimension of a channel in a cross section of the channel. For example, in a case where the cross section of the channel is in a circle shape, the diameter refers to a diameter of the circle (that is, the case shown in the figure); in a case where the cross section of the channel is a in a square shape, the diameter refers to a diagonal of the square; in a case where the cross section of the channel is a in a rectangle shape, the diameter refers to a diagonal of the rectangle, that is, the "diameter" can be understood as a representative size passing through a center of the cross section of the channel.

For example, in some embodiments, as shown in FIG. 1 and FIG. 2, the second channel 1021 includes at least one partition column 1022, which includes a case that the second channel 1021 has one partition column, or a case that the second channel 1021 has a plurality of partition columns 1022, for example, the second channel 1021 has two, three, four (the case shown in the figure), or five partition columns 1022, and the like, and the number of the partition columns 1022 can be selected according to actual needs.

For example, the first channel 1011, the second channel 1021, and the chamber 1031 are parallel, that is, extend in the same direction (the vertical direction in FIG. 1), the first channel 1011 includes a second opening 1013 connected to the second channel 1021, and a plurality of partition columns 1022 are arranged at intervals around the second opening 1013. The second channel 1021 has a third opening connected to the chamber 1031. For example, in the extension direction, a projection of the second opening 1013 of the first channel 1011 is located in the cross section of the second channel 1021, and a projection of the third opening of the second channel 1021 is located in the cross section of the chamber 1031. For example, the first channel 1011, the second channel 1021, and the chamber 1031 have the same central axis. For example, the first channel 1011, the second channel 1021, and the chamber 1031 are centro-symmetrical around the central axis.

For example, there is a first gap between the partition column 1022 and the channel wall 1023 of the second channel 1021, and there is a second gap L2 between adjacent partition columns 1022, and therefore both the first gap L1 and the second gap L2 can promote the absorption process of the sample to be tested based on capillary action. In addition, in a case where the sample to be tested is mixed with the detection reagent, the first gap L1 and the second gap L2 form a plurality of shunt channels, which can make the sample to be tested and the detection reagent mix more fully (detailed later). A length of the partition column 1022 may be less than or equal to a length of the second channel 1021, so that an upper end surface of the partition column 1022 may be flush with a bottom surface of the chamber 1031 or may be away from the bottom surface of the chamber 1031 by a predetermined distance.

For example, in some embodiments, the plurality of partition columns 1022 are arranged centro-symmetrically around a central axis of the second opening 1013, so that the second channel 1021 has the same or similar degree of absorption and mixing functions at different positions.

For example, in some embodiments, as shown in FIG. 1 and FIG. 2, each partition column 1022 at least partially overlaps with the second opening 1013, that is, in the extending direction of the second channel 1021, a projection of each partition column 1022 overlaps with the second opening 1013. For example, each partition column 1022 partially shields the second opening 1013, so that the sample to be tested absorbed from the first channel 1011 can fully enter the first gap L1 and the second gap L2 in the second channel 1021, so as to achieve the functions of absorption and split-flow through the first gap L1 and the second gap L2.

For example, in some embodiments, as shown in FIG. 1 and FIG. 2, the first channel 1011 and the second channel 1021 may be in cylindrical shapes, that is, are circular channels. A cross section of each partition column 1022 may have various suitable shapes, for example, a fan-shape. For example, the plurality of partition columns 1022 are arranged opposite to each other and an overall shape obtained by an arrangement of the plurality of partition columns 1022 is in a cylindrical shape (that is, the overall shape is a circular shape). In this case, the first gap L1 between each partition column 1022 and the channel wall 1023 of the second channel 1021 is substantially the same, and the second gap L2 between every two adjacent partition columns 1022 is also basically the same, thereby further improving the uniformly absorbing and split-flowing effect of the second channel 1021.

For example, in some embodiments, the structural parameters of respective parts of the sampling structure can be designed to better achieve the varies functions of the sampling structure. For example, a width of the second gap L2 between adjacent partition columns 1022 is 0.1 mm~2.5 mm, for example, may be 0.2 mm, 0.5 mm, 1 mm, or 2 mm.

For example, in some embodiments, a radius R1 of the first channel 1011 is 0.1 mm~3 mm, such as 0.3 mm, 0.5 mm, 0.6 mm, 1 mm, or 2 mm, etc., and a radius R2 of the second channel 1021 is greater than the radius R1 of the first channel, and may be, for example, 1 mm~10 mm, such as 2 mm, 4 mm, 6 mm, or 8 mm.

For example, in some embodiments, in a case where the cross section of each partition column 1022 is in a fan-shape, a radius R3 of the fan-shape is 0.5 mm~8 mm, for example, may be 1.5 mm, 2.5 mm, 3.5 mm, 4.5 mm, 5.5 mm, 6.5 mm, or the like.

For example, in some embodiments, a length H1 of the first channel 1011 is 0.1 mm~10 mm, such as 0.5 mm, 1 mm, 1.5 mm, 3 mm, 5 mm, or 8 mm, etc., and a length H2 of the second channel 1021 is 1 mm~10 mm, for example, may be 3 mm, 5 mm, 7 mm, or 9 mm.

In this case, the amount V1 of the sample that can be absorbed by the first channel 1011 is $\pi \times (R1)^2 \times (H1)$, and the amount V2 of the sample that can be absorbed by the second channel 1021 is $\pi \times [(R2)^2 - (R3)^2] \times (H2)$, so the amount of the sample V that can be absorbed by the sampling structure is at least equal to V1+V2.

Because the first channel 1011 and the second channel 2011 of the sampling structure can absorb samples together, the total amount of the sample absorbed by the sampling structure is relatively large, in other words, the height of the sampling structure is lower in the case of absorbing the same total amount of sample, and therefore the sampling structure can be applied to the case where the microfluidic biochip is relatively thin, that is, the sampling structure is easier to match with the microfluidic biochip.

In addition, in the above sampling structure, because the first channel 1011 and the second channel 2011 are relatively thin, in a process when the sample to be tested is mixed with the detection reagent and enters the chamber 1031 through the first channel 1011 and the second channel 2011, the flow speed of the mixed solution is increased, and the mixed solution can rush into the chamber 1031 at a relatively high speed to form a swirling mixing, thereby improving the mixing efficiency.

For example, in some embodiments, the first main body 101, the second main body 102, and the third main body 103 of the sampling structure may be in an integral structure. In this case, in a manufacturing process, one process can be used to complete the manufacturing of the sampling structure to simplify the manufacturing process. For example, an integrated injection molding process can be used to complete the manufacturing of the sampling structure, that is, the first main body 101, the second main body 102, and the third main body 103 are formed by using the same material through the same injection molding process, in this case, there is no interface between the first main body 101, the second main body 102, and the third main body 103.

For example, in some embodiments, the material of the sampling structure may be polymethylmethacrylate (PMMA), polystyrene (PS), polycarbonate (PC), polypropylene (PP), or the like. For example, the sampling structure can be manufactured by an upper and lower de-molding injection molding process, which includes, for example, filling the material of the sampling structure into a mold by a method of applying pressure, injecting, etc., and then cooling the material, separating the material from the mold, and other steps. The manufacturing process is simple, and can increase the yield and save costs.

Figure 3:
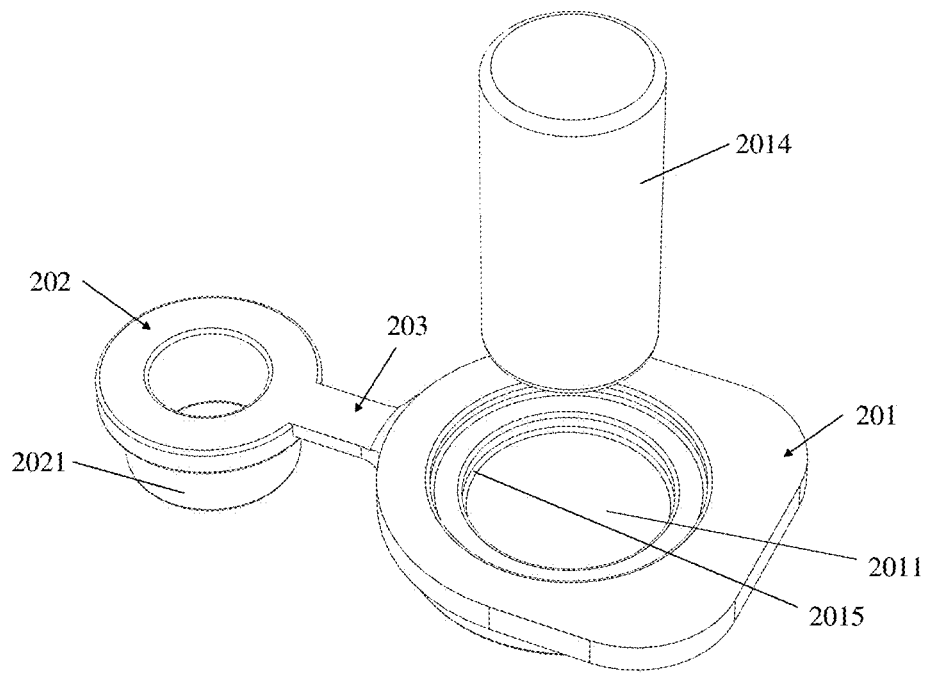
FIG. 3 is a stereoscopic view of a sealing structure provided by at least one embodiment of the present disclosure.

At least one embodiment of the present disclosure further provides a sealing structure, as shown in FIG. 3, the sealing structure includes a sealing part 201, the sealing part 201 includes a main body part 2011 having elasticity, the main body part 2011 may include an elastic diaphragm having a predetermined thickness; the sealing part 201 includes at least one exhaust hole, and the exhaust hole is configured to be in an open state or a closed state respectively in a case where the main body part 2011 is subjected to different forces.

For example, in some embodiments, the sealing structure may further include a fixing part 202. The fixing part 202 is fixedly connected to the sealing part 201 and includes a fixing structure 2021. The sealing structure can be used to fix and seal the above-mentioned sampling structure, for example.

For example, as shown in FIG. 3, the fixing structure 2021 may be an annular sleeve structure. For example, the annular sleeve structure includes an annular protrusion, and the annular protrusion can be fixed to other structure (such as an annular groove) matched with the annular protrusion by a bell and spigot joint mode. The fixing part 202 and the sealing part 201 may be connected to each other through a connecting part 203 provided therebetween, or the fixing part 202 and the sealing part 201 may be directly connected.

Figure 4:
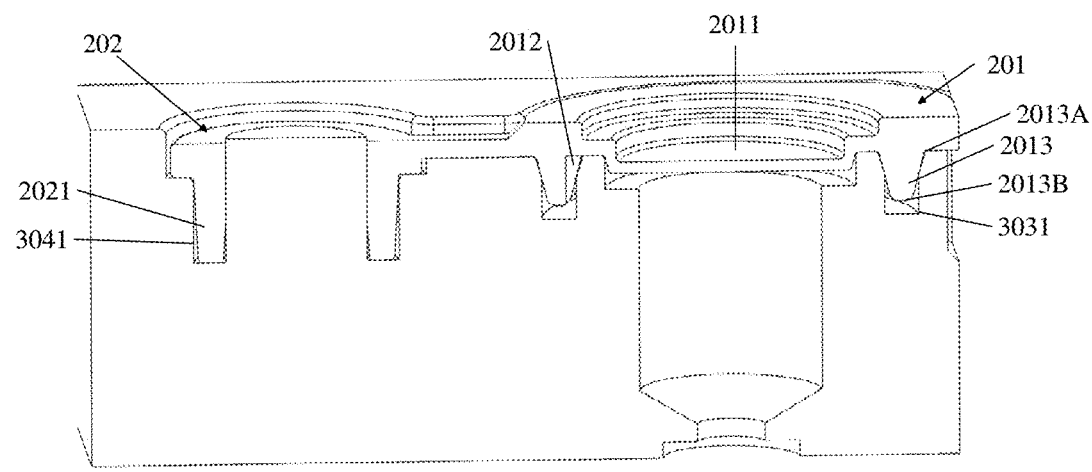
FIG. 4 is a cross-sectional view of a sealing structure provided by at least one embodiment of the present disclosure.

For example, FIG. 4 shows a schematic cross-sectional view of a sealing structure sealed to a sampling structure. For example, the sealing part 202 of the sealing structure is used to fix the sampling structure to a device (for example, a microfluidic chip, which will be described later), and the sealing part 201 of the sealing structure is used to seal the sampling structure.

Figure 5:
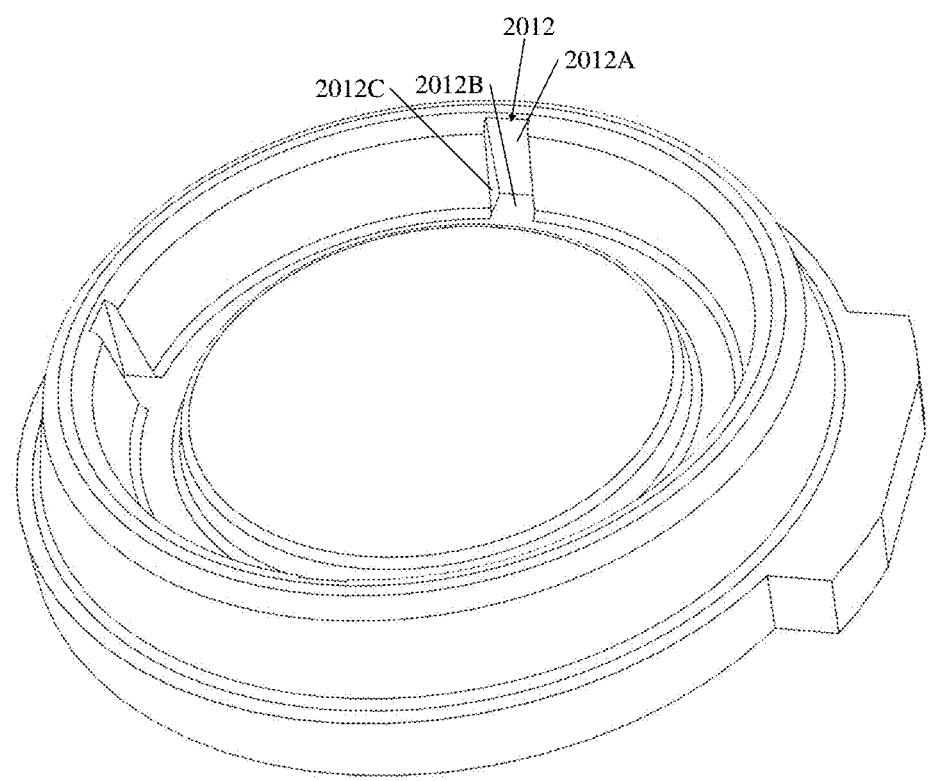
FIG. 5 is a stereoscopic view of a sealing part of a sealing structure provided by at least one embodiment of the present disclosure.

For example, FIG. 5 shows a schematic structural view of the sealing part, and FIG. 5 shows a stereoscopic view viewed from the bottom of the sealing part 202 (for example, the lower side in FIG. 4). As shown in FIG. 5, the sealing part includes at least one exhaust hole 2012, for example, the main body part 2011 of the sealing part includes at least one exhaust hole 2012, such as a plurality of exhaust holes 2012, at a peripheral position, these exhaust holes are evenly distributed along the sealing part 201. The exhaust hole 2012 is configured to be in an open state or a closed state respectively in a case where the main body part 2011 is subjected to different forces, so that the internal pressure of the sampling structure can be adjusted.

For example, in some embodiments, as shown in FIG. 3, a top rod 2014 may be used to abut against the main body part 2011 to apply a force to the main body part 2011, thereby operating the sampling structure. For example, in a case where the force received by the main body part 2011 is less than a threshold, the exhaust hole 2012 is in an open state; in a case where the force received by the main body part 2011 is greater than or equal to the threshold, the exhaust hole 2012 is in a closed state. Thus, the exhaust hole 2012 can achieve the function of a check valve.

For example, in some embodiments, as shown in FIG. 5, the exhaust hole 2012 may be a triangular prism exhaust hole, which includes a first wall 2012A and a second wall 2012B that are contacted with the main body part 2011, the first wall 2012A is contacted with the second wall 2012B, and two triangular openings 2012C, which are opposite to each other, are respectively formed between the first wall 2012A and the main body part 2011 and between the second wall 2012B and the main body part 2011. In a case where the force received by the main body part 2011 is greater than or equal to the threshold, the first wall 2012A and the second wall 2012B can be stretched to be located on the same plane, so that the two triangular openings 2012C are closed and the exhaust hole 2012 is in the closed state. In a case where the force received by the main body part 2011 is less than the threshold, the exhaust hole 2012 is in an open state, in this case, the first wall 2012A, the second wall 2012B, the triangular openings 2012C, etc. may form a triangular prism shape.

Figure 6:
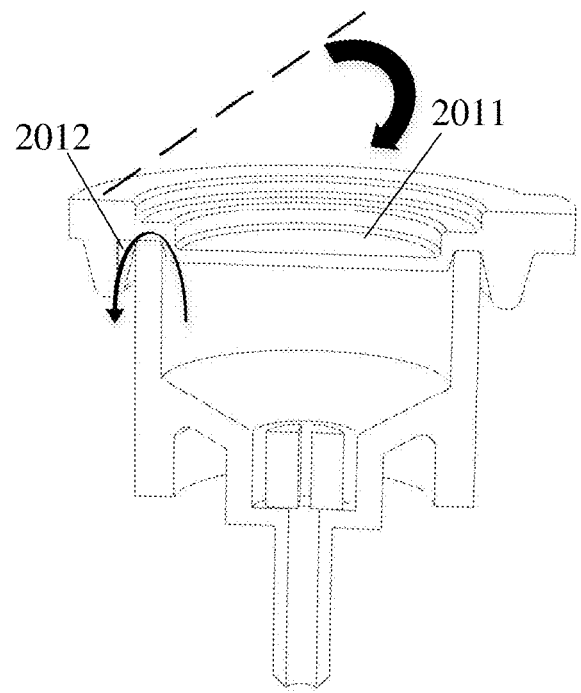
FIG. 6 is a schematic diagram showing a sampling structure and a sealing structure matched with each other provided by at least one embodiment of the present disclosure.

For example, FIG. 6 shows a schematic diagram showing a case that the main body part 2011 is installed on and matched with the sampling structure. Referring to FIG. 6, as shown by the thick arrow in the figure, during the operation, a gradually increasing force can be applied to the main body part 2011 through a top rod (not shown in the figure), the main body 2011 is subjected to the force to move downward to squeeze the gas in the chamber of the sampling structure, in a case where the force received by the main body part 2011 is less than the threshold, the exhaust hole 2012 is in an open state, the gas in the chamber of the sampling structure can be exhausted through the exhaust hole 2012, as shown by a thin arrow in the figure, and therefore the air pressure in the chamber of the sampling structure does not change. In a case where the force received by the main body part 2011 is greater than or equal to the threshold, the exhaust hole 2012 is in a closed state, and the main body part 2011 is subjected to the force to continue to move downward, so that the air pressure in the sampling structure increases, in this case, the sample in the chamber or channel of the sampling structure can be pushed out. Therefore, through the design of the exhaust hole, the internal pressure of the sampling structure can be prevented from excessively increasing in a short period of time, thereby preventing the speed of pushing out the sample from being too fast to control the push-out amount of the sample.

For example, in some embodiments, as shown in FIG. 4, the sealing part 201 may further include a protrusion part 2013 for sealing, and the protrusion part 2013 is arranged around the main body part 2011, and a plane view of the protrusion part 2013 is in an annular shape. Referring to FIG. 3 and FIG. 4, the main body part 2011 includes a stepped part at the periphery, and the diaphragm part of the main body part 2011 is connected to the protrusion part 2013 through the stepped part. In addition, a longitudinal section of the protruding part 2013 is in a shape gradually narrowing from a first end 2013A of the protruding part 2013 to a second end 2013B of the protruding part 2013. The first end 2013A of the protruding part 2013 is an end (an upper end shown in the figure) connected to the main body part 2011, and the second end 2013B of the protruding part 2013 is an opposite end of the first end 2013A (a lower end in the figure). For example, a width of the second end 2013B may be 0.5 mm~5 mm, for example, 2 mm, 3 mm, 4 mm, etc., and an inclination angle (relative to the vertical direction in the figure) of a side wall of the protrusion part 2013 may be 2°~20°, for example, may be 10°, 14°, 18°, etc. For example, in some embodiments, the exhaust hole 2012 may be disposed on an inner side wall of the protrusion part 2013, as shown in FIG. 4.

For example, in some embodiments, the fixing part 202 and the sealing part 201 may be in an integral structure, and are made of an elastic material, the elastic material may be an artificial synthetic material or a natural material. For example, the fixing part and the sealing part are an integral silica-gel structure, and the silica-gel structure has high elasticity and can better achieve the sealing function. In this case, in the manufacturing process, the fixing part 202 and the sealing part 201 may be integrally formed to simplify the manufacturing process and increase the yield.

Figure 7:
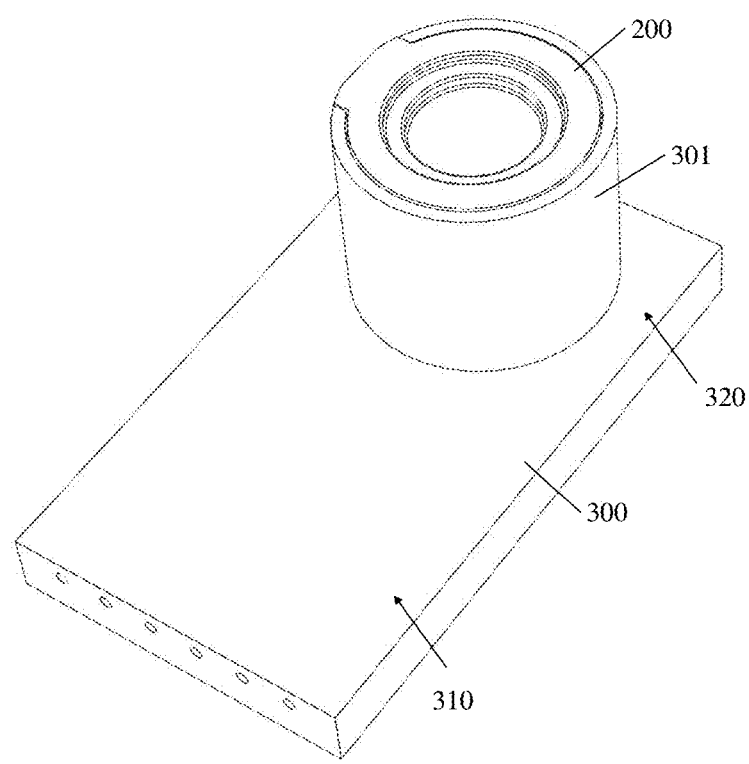
FIG. 7 is a stereoscopic view of a detection assembly provided by at least one embodiment of the present disclosure.

At least one embodiment of the present disclosure provides a detection assembly. As shown in FIG. 7, the detection assembly includes a microfluidic chip 300, the sampling structure described in any one of the above-mentioned embodiments, and a sealing structure 200.

For example, the microfluidic chip 300 includes a chip main body part 310 and a chip interface part 320. The chip interface part 320 is arranged on one side of the chip main body part 310 and includes a sampling structure installation component 301; the chip main body part 310 includes a channel that is linked with the chip interface part 320, a detection structure, etc., for example, driving electrodes are provided in the channel to drive the sample through electrowetting on the medium, the detection structure may include a photoelectric detection device, etc. For these structures, for example, an existing microfluidic chip may be referred to, which will not be described in detail here.

Because FIG. 7 shows a schematic diagram of the detection assembly after assembling, in this case, the sampling structure has been installed in the sampling structure installation component 301 of the microfluidic chip 300, and therefore, for simplification, the sampling structure is not specifically shown in FIG. 7.

Figure 9:
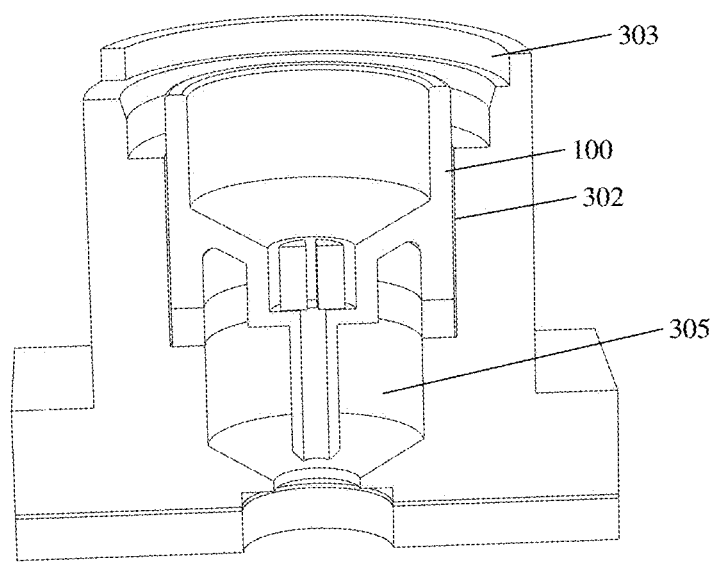
FIG. 9 is a partial cross-sectional view of a detection assembly provided by at least one embodiment of the present disclosure.

For example, FIG. 9 shows a schematic cross-sectional view of the sampling structure installation component 301. In this case, the sampling structure is disposed in the sampling structure installation component 301. As shown in FIG. 9, the sampling structure installation component 301 includes a sampling groove 302 and a sampling structure installation part 303, and the sampling structure installation part 303 is linked with the sampling groove 302, the sampling structure 100 may be disposed in the sampling groove 302, and the sealing structure 200 may be installed in the sampling structure installation part 303 for sealing the sampling structure 100.

For example, the microfluidic chip 300 further includes a reagent pool 305 for storing detection reagents. After the sampling structure 100 is installed on the microfluidic chip 300, the sampling structure 100 extends into the reagent pool 305, so that the sample to be tested can be mixed with the detection reagent in the reagent pool 305. For example, the microfluidic chip 300 further includes a microfluidic channel that is connected with the reagent pool 305 and a detection assembly (not shown in the figure) connected to the microfluidic channel. When the sample to be tested is mixed with the detection reagent in the reagent pool 305, the mixed solution can be transported to the detection component through the microfluidic channel for detection. For example, there may be a plurality of detection components, which are respectively connected to the reagent pool 305 through microfluidic channels, thereby achieving to perform a plurality of tests on the sample to be tested at the same time.

For example, in some embodiments, the mixing ratio of the sample to be tested and the detection reagent may be constant, and the volume of the detection reagent in the reagent pool 305 is constant, that is, the height of the detection reagent in the reagent pool 305 is constant. In this case, the design of a lower structure, such as the first channel and the second channel, of the sampling structure provided by the embodiments of the present disclosure can better adapt to the liquid level height, such as a low liquid level height, of the detection reagent in the reagent pool 305.

Figure 8:
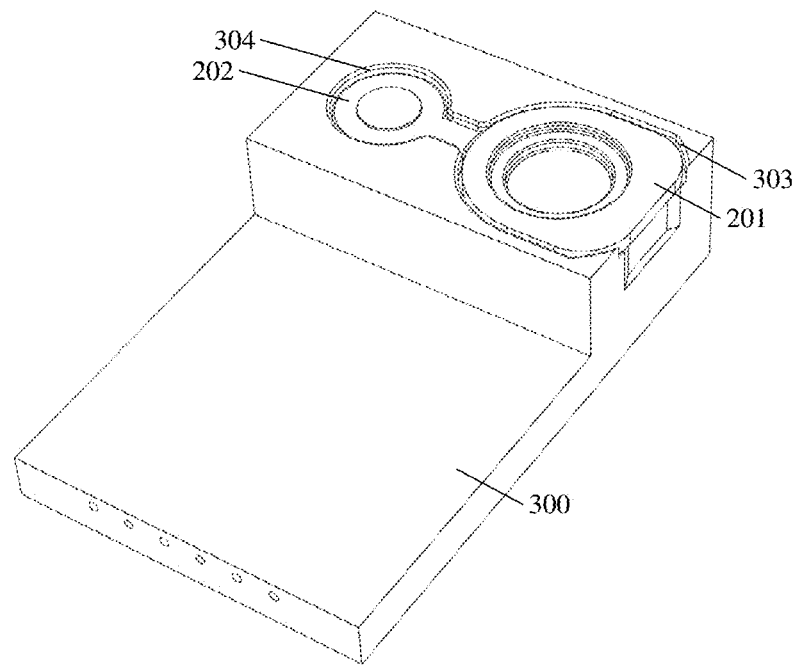
FIG. 8 is a stereoscopic view of another detection assembly provided by at least one embodiment of the present disclosure.

For example, in some embodiments, the sealing structure 200 is the sealing structure provided by the above-mentioned embodiments of the present disclosure, in this case, as shown in FIG. 8, the microfluidic chip 300 further includes a sealing structure installation part 304. For example, the sealing part 201 of the sealing structure can be installed on the sampling structure installation part 303, and the fixing part 202 of the sealing structure can be installed on a sealing structure installation part 304.

For example, in some embodiments, referring to FIG. 4, in the case where the fixing structure of the sealing structure is an annular sleeve structure, the sealing structure installation part 304 includes an annular groove 3041 that is matched with the annular sleeve structure. Thus, the sealing structure can be stably fixed to the microfluidic chip.

For example, in some embodiments, referring to FIG. 4, in the case where the sealing part 201 of the sealing structure includes a protrusion part 2013 for sealing, the sampling structure installation part 303 includes a clamping slot 3031 matched with the protrusion part 2013. Therefore, the sealing part 201 can achieve both the fixing function and the sealing function. In addition, due to the inclination angle of the side wall of the protrusion part 2013, in the case where the protrusion part 2013 is pressed in the clamping slot 3031, the protrusion part 2013 and the clamping slot 3031 can abut against each other, thereby further improving the sealing effect.

For example, in some embodiments, referring to FIG. 3, the detection assembly further includes a top rod 2014. The top rod 2014 is movably arranged, for example, can be driven by a driving device (such as a stepping motor), so as to move in an up-down direction in the figure, the top rod 2014 can be used to apply a force to the main body part 2011 of the sealing part 201. For example, the force applied by the top rod 2014 to the main body part 2011 can be adjusted, so that the purpose of adjusting the internal pressure of the sampling structure can be achieved by controlling the top rod 2014.

For example, in some embodiments, the main body part 2011 of the sealing part 201 further includes a concave-platform groove 2015 that cooperates with the top rod 2014 to guide the force application position of the top rod 2014. For example, the concave-platform groove 2015 and the top rod 2014 have the same shape, for example, the cross sections of the concave-platform groove 2015 and the top rod 20 are both in circular shapes. For example, the diameter of the concave-platform groove 2015 is slightly larger than the diameter of the top rod 2014, and the concave-platform groove 2015 has a step, so as to facilitate to guide the force application position of the top rod 2014.

Hereinafter, the working process of the detection assembly will be exemplarily introduced in conjunction with FIG. 10 and FIG. 11.

First, the sample to be tested is absorbed by the sampling structure, at this time, the sample to be tested can be absorbed from the first channel and the second channel of the sampling structure based on capillary action. The sample to be tested may be, for example, blood, body fluid, etc., and the embodiments of the present disclosure are not limited in this aspect.

Then, the sampling structure is installed on the microfluidic chip, and the sampling structure is fixed and sealed by the sealing structure. For example, after the sampling structure is installed on the microfluidic chip, the bottom of the sampling structure extends into the reagent pool of the microfluidic chip, so that the sample to be tested can be mixed with the detection reagent in the reagent pool. For example, the upper surface of the reagent pool has an aluminum foil film for encapsulating the detection reagents. In a case where the sampling structure is installed on the microfluidic chip, the sampling structure can pierce the aluminum foil film to be connected with the reagent pool. For example, the bottom of the reagent pool is heat sealed with aluminum foil. After the sampling structure and the sealing structure are installed, two sealing chambers that are connected are formed in the microfluidic chip, one sealing chamber is a first sealing chamber formed by the first channel, the second channel, and the chamber in the sampling structure, and the other sealing chamber is a second sealing chamber formed by the reagent pool.

Figure 10:
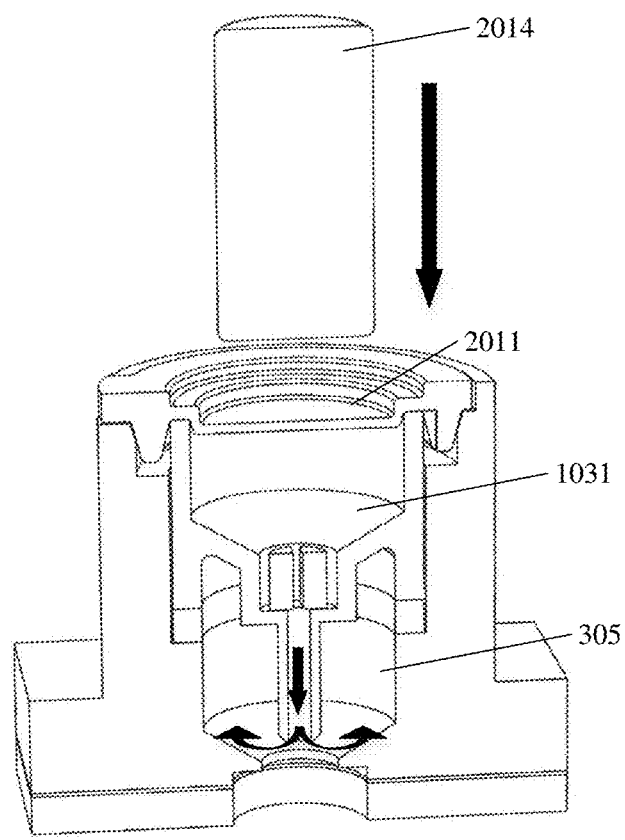
FIG. 10 is a working principle diagram of a detection assembly provided by at least one embodiment of the present disclosure.

As shown in FIG. 10, the top rod 2014 is used to apply a force to the main body part 2011 of the sealing part, when the force is weak and is less than the threshold pressure, the exhaust hole is in an open state, and the sampling structure can exhaust air or overflow liquid through the exhaust hole. When the applied force gradually increases to be greater than or equal to the threshold pressure, the exhaust hole is in a closed state, as this time, the pressure inside the sampling structure increases, so that the sample to be tested is pushed out of the sampling structure and enters the reagent pool, as shown by the arrow in FIG. 10. Thus, the sample and the detection reagent in the reagent pool can be mixed.

Figure 11:
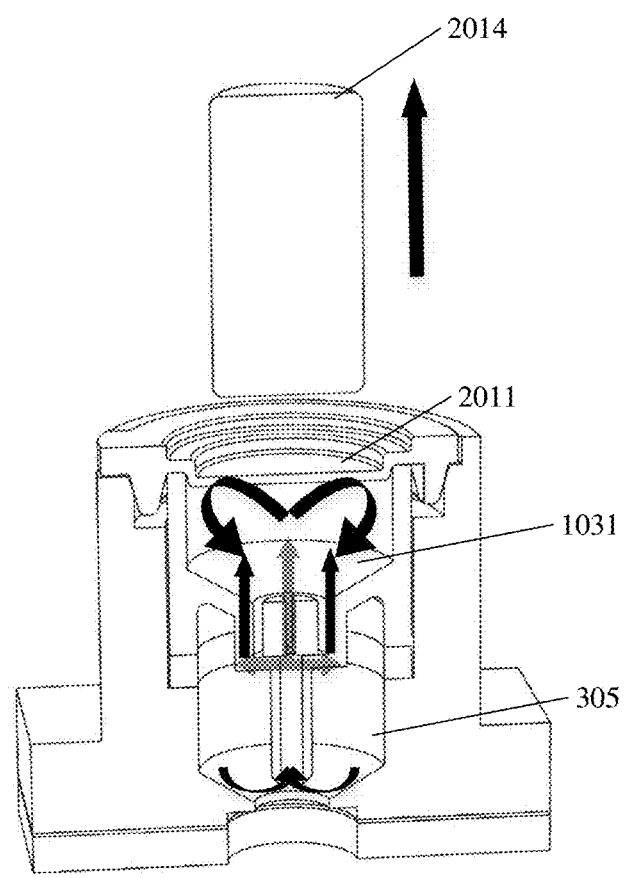
FIG. 11 is another working principle diagram of a detection assembly provided by at least one embodiment of the present disclosure.

As shown in FIG. 11, in a case where the top rod 2014 is retracted, the main body part 2011 rebounds, at this time, the mixed solution of the detection reagent in the reagent pool and the sample to be tested will be absorbed back into the sampling structure. Because in the sampling structure, the second channel has partition columns, a plurality of narrow gaps are formed between adjacent partition columns and between the partition columns and the channel wall, therefore, after the mixed solution flows through the first channel and the second channel, the flow speed of the mixed solution will increase, and the mixed solution can rush into the chamber of the sampling structure at a relatively high speed and form a swirling mixing with the sample to be tested in the sampling structure, as shown by the arrow in FIG. 11, thereby improving the mixing efficiency and making the detection reagent and the sample to be tested mix more uniformly. In this case, one mixing operation is completed.

For example, the above mixing operation can be performed several times to further improve the mixing effect of the sample to be tested and the detection reagent.

For example, after the detection reagent and the sample to be tested are fully mixed, the reagent pool can inject the mixed solution into the detection component through the microfluidic channel connected to the reagent pool. In this process, a force can be applied to the main body part 2011 by the top rod 2014, so that the mixed solution can enter the microfluidic channel. In this case, because the main body part 2011 has an exhaust hole, the pressure in the sampling structure and the pressure in the reagent pool will not increase rapidly during the process of applying the force to the sampling structure and the reagent pool, so as to prevent the mixed solution from rushing into the microfluidic channel in a short period of time, and furthermore, the output speed and the output volume of the mixed solution can be controlled more accurately.

When the mixed solution enters the detection component, the detection component can detect the sample, thereby achieving the automatic detection process of the microfluidic chip.

It should be noted that, in some embodiments, the sealing structure that cooperates with the sampling structure may have only a sealing part but do not have a fixing part, referring to FIG. 6 and FIG. 7, in this case, the sealing structure can also achieve functions such as sealing and fixing the sampling structure.

For example, in some embodiments, the microfluidic chip may further include a mixing structure, a filtering structure, and the like, which are connected in the middle of the microfluidic channel, and the embodiments of the present disclosure do not limit other functional structures of the microfluidic chip. For example, the mixing structure can further improve the mixing effect of the detection reagent and the sample to be tested. The filtering structure can filter the mixed solution of the detection reagent and the sample to be tested, to obtain a pure sample to be tested for detection. For example, in a case where the sample to be tested is blood, the filtering structure can filter out blood clots that may exist in the blood and other substances that may affect the detection.

The detection assembly provided by at least one embodiment of the present disclosure can complete the analysis and detection process of the sample to be tested by simple operations after the sampling of the sample to be tested is completed, and the analysis and detection result is more accurate.

The following several statements should be noted:
(1) The accompanying drawings involve only the structure(s) in connection with the embodiment(s) of the present disclosure, and other structure(s) can be referred to common design(s).
(2) For clarity, in accompanying drawings for illustrating the embodiment(s) of the present disclosure, the thickness of a layer or a structure may be enlarged or reduced, that is, the drawings are not drawn to the actual scale.
(3) In case of no conflict, embodiments of the present disclosure and the features in the embodiments may be mutually combined to obtain new embodiments.

The above descriptions are only specific embodiments of the present disclosure, but the protection scope of the present disclosure is not limited thereto, those skilled in the art may make some improvements and modifications within the technical scope of the present disclosure, and the improvements and modifications should be within the protection scope of the present disclosure. Therefore, the protection scope of the present disclosure should be determined by the protection scope of the claims.

What is claimed is:

1. A sampling structure, comprising:
a first main body, comprising a first channel, wherein the first channel comprises a first opening that is exposed;
a second main body, connected to the first main body and comprising a second channel and at least one partition column located in the second channel, wherein the second channel is linked with the first channel, and a first gap is between the at least one partition column and a channel wall of the second channel; and
a third main body, connected to the second main body and comprising a chamber, wherein the chamber is linked with the second channel and is capable of containing a sample;
wherein the at least one partition column comprises a plurality of partition columns, the first channel comprises a second opening connected to the second channel, and the plurality of partition columns are arranged at intervals around the second opening.

2. The sampling structure according to claim 1, wherein the plurality of partition columns are arranged centro-symmetrically around a center axis of the second opening.

3. The sampling structure according to claim 1, wherein each of the plurality of partition columns at least partially overlaps with the second opening.

4. The sampling structure according to claim 1, wherein a cross section of each of the plurality of partition columns is in a fan-shape;
the plurality of partition columns are arranged opposite to each other and an overall shape obtained by an arrangement of the plurality of partition columns is a cylindrical shape.

5. The sampling structure according to claim 1, wherein a second gap is between adjacent partition columns, and a width of the second gap is 0.1 mm~2.5 mm.

6. The sampling structure according to claim 5, wherein a radius of the first channel is 0.1 mm~3 mm, and a radius of the second channel is 1 mm~10 mm;
a cross section of each of the plurality of partition columns is in a fan-shape, and a radius of the fan-shape is 0.5 mm~8 mm.

7. The sampling structure according to claim 1, wherein a length of the first channel is 0.1 mm~10 mm, and a length of the second channel is 1 mm~10 mm.

8. The sampling structure according to claim 1, wherein the first main body, the second main body, and the third main body are in an integral structure.

9. A sealing structure for sealing the sampling structure according to claim 1, comprising:
a sealing part, comprising a main body part having elasticity;
wherein the sealing part comprises at least one exhaust hole, and the exhaust hole is configured to be in an open state or a closed state respectively in a case where the main body part is subjected to different forces.

10. The sealing structure according to claim 9, further comprising: a fixing part,
   wherein the fixing part is fixedly connected with the sealing part and comprises a fixing structure.

11. The sealing structure according to claim 10, wherein the fixing structure is an annular sleeve structure.

12. The sealing structure according to claim 9, wherein in a case where a force received by the main body part is less than a threshold, the exhaust hole is in the open state; and
   in a case where the force received by the main body part is greater than or equal to the threshold, the exhaust hole is in the closed state.

13. The sealing structure according to claim 12, wherein the exhaust hole is a triangular prism exhaust hole, and comprises a first wall and a second wall connected with the main body part,
   the first wall and the second wall are connected, and two triangular openings, which are opposite to each other, are respectively formed between the first wall and the main body part and between the second wall and the main body part,
   in a case where the force received by the main body part is greater than or equal to the threshold, the first wall and the second wall are stretched to be located on a same plane, so that the two triangular openings are closed and the exhaust hole is in the closed state.

14. The sealing structure according to claim 9, wherein the sealing part further comprises a protrusion part for sealing, and the protrusion part is arranged around the main body part,
   a longitudinal section of the protrusion part is in a shape gradually narrowing from a first end of the protrusion part to a second end of the protrusion part, the first end of the protrusion part is an end connected to the main body part, and the second end of the protrusion part is an opposite end of the first end.

15. The sealing structure according to claim 10, wherein the fixing part and the sealing part are in an integral structure.

16. A detection assembly, comprising: a microfluidic chip, the sampling structure according to claim 1 and a sealing structure,
   the microfluidic chip comprises a sampling groove and a sampling structure installation part, the sampling structure installation part is linked with the sampling groove,
   the sampling structure is arranged in the sampling groove, and the sealing structure is installed on the sampling structure installation part for sealing the sampling structure.

17. The detection assembly according to claim 16, wherein the sealing structure comprises:
   a sealing part, comprising a main body part having elasticity; and
   a fixing part, wherein the fixing part is fixedly connected with the sealing part and comprises a fixing structure, the sealing part comprises at least one exhaust hole, and the exhaust hole is configured to be in an open state or a closed state respectively in a case where the main body part is subjected to different forces, and the microfluidic chip further comprises a sealing structure installation part,
   wherein the sealing part of the sealing structure is installed on the sampling structure installation part, and the fixing part of the sealing structure is installed on the sealing structure installation part.

18. The detection assembly according to claim 17, wherein the fixing structure of the sealing structure is an annular sleeve structure, and the sealing structure installation part comprises an annular groove matched with the annular sleeve structure;
   the sealing part of the sealing structure further comprises a protrusion part for sealing, and the sampling structure installation part comprises a clamping slot matched with the protrusion part.

19. The detection assembly according to claim 17, further comprising: a top rod, wherein the top rod is movably arranged for applying a force to the main body part;
   the main body part further comprises a concave-platform groove matched with the top rod to guide a force application position of the top rod.

\* \* \* \* \*